United States Patent [19]

Dudley

[11] Patent Number: 5,062,276
[45] Date of Patent: Nov. 5, 1991

[54] HUMIDITY CONTROL FOR VARIABLE SPEED AIR CONDITIONER

[75] Inventor: Kevin F. Dudley, Cazenovia, N.Y.

[73] Assignee: Electric Power Research Institute, Inc., Palo Alto, Calif.

[21] Appl. No.: 585,607

[22] Filed: Sep. 20, 1990

[51] Int. Cl.⁵ ............................................. F25B 49/00
[52] U.S. Cl. ..................... 62/176.6; 62/180; 62/228.4
[58] Field of Search ............... 62/228.4, 229, 176.6, 62/93, 180

[56] References Cited

U.S. PATENT DOCUMENTS

| | | | |
|---|---|---|---|
| 4,257,238 | 3/1981 | Kountz et al. | 62/176.6 X |
| 4,783,970 | 11/1988 | Takahashi | 62/176.3 |
| 4,873,649 | 10/1989 | Grald et al. | |

Primary Examiner—William E. Wayner
Attorney, Agent, or Firm—Wall and Roehrig

[57] ABSTRACT

An air conditioner system of the type having a variable speed compressor and an indoor heat exchanger having a variable speed fan for controlling the rate of air flow over the evaporator coil has a controller which employs the benefits of variable speed compressors and the variable indoor fan to improve humidity control. During a normal cycle when the relative humidity is below a setpoint, the compressor speed is varied as a function of cooling demand between a minimum compressor speed and full compressor speed. The fan speed is varied generally linearly with the compressor speed between a minimum fan speed and full fan speed. When the humidity level is above the setpoint, the relationship between compressor speed is altered to increase the amount of dehumidification. The minimum compressor speed is increased, while the minimum air flow speed remains the same. The compressor speed is then controlled between this higher minimum speed and full speed, while the fan speed is controlled between minimum fan speed and full fan speed.

9 Claims, 2 Drawing Sheets

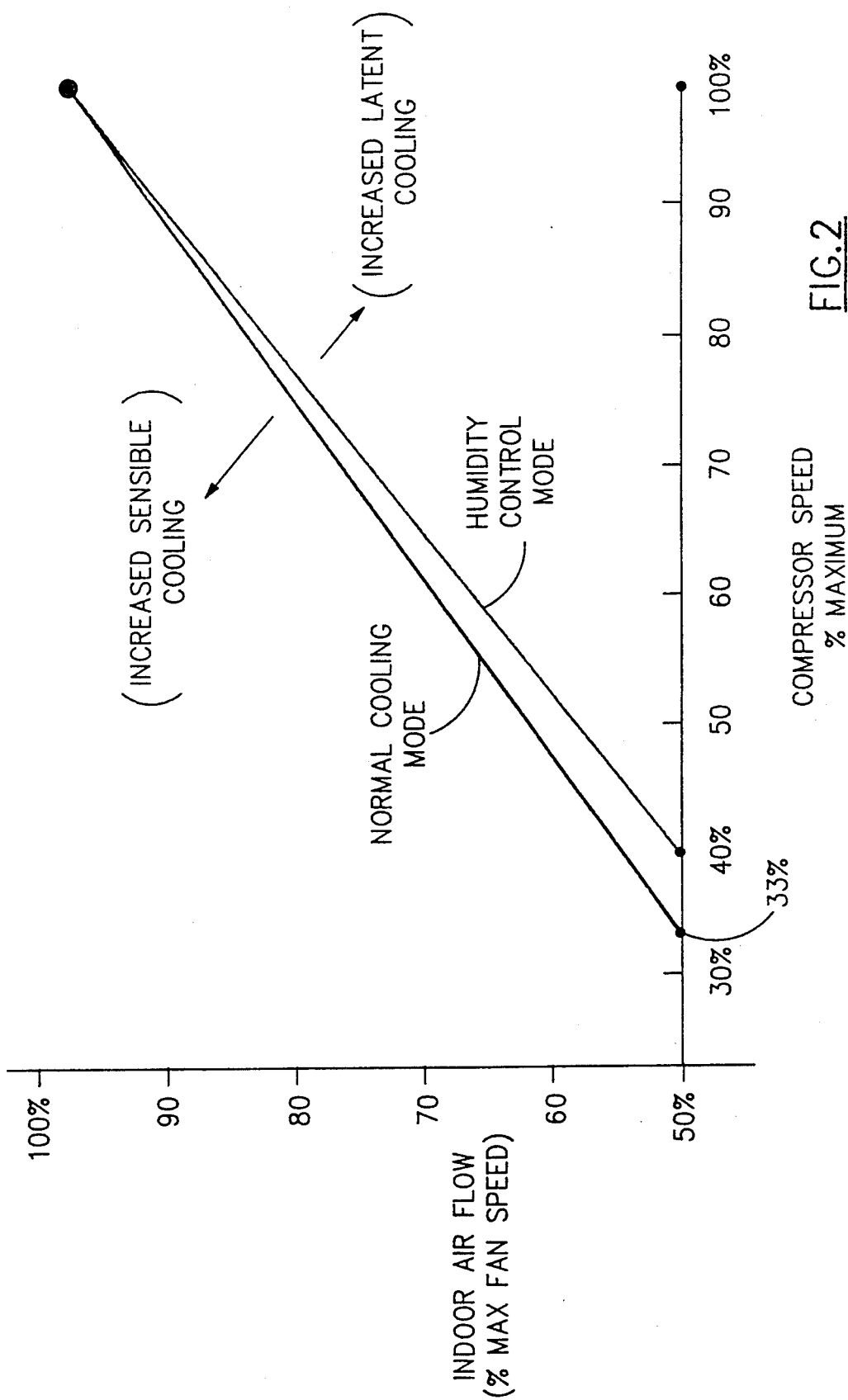

HUMIDITY CONTROL FOR VARIABLE SPEED AIR CONDITIONER

BACKGROUND OF THE INVENTION

This invention is directed to commercial or residential heat pump systems that provide heating or cooling of a comfort zone, as required, and which can also provide water heating. The invention is more particularly directed towards an improved system of controlling both the sensible temperature and latent temperature of air in a comfort space, employing the operating features of a variable speed heat pump employed for space cooling.

Integrated heat pumps are often employed for comfort heating or cooling, as needed, to a residential or commercial comfort space, i.e., the interior of a residence, office complex, hospital, or the like. Integrated heat pumps can also be employed to heat water. A heat pump system for air conditioning, comfort space heating, and water heating is described in U.S. Pat. No. 4,766,734. Systems of this type can have a number of modes of operation, such as air conditioning alone, space heating alone, water heating alone, air conditioning with water heating, and comfort space heating with water heating. Additional modes, such as a defrost cycle, can also be employed. For comfort space heating and water heating, resistive elements are employed as auxiliary heating elements for use at times when the heat pump alone cannot produce sufficient heating for the comfort space or produce enough hot water in the water heater.

During early morning hours and in the late evening, there may be unusually high humidity accompanied by a low sensible cooling load. At those times control for the heat pump system by temperature alone can often produce insufficient dehumidification.

In the cooler parts of a summer day, the indoor comfort space air can feel somewhat stuffy because of increased relative humidity. However, if the thermostat setpoint is lowered to produce equivalent comfort for persons in the comfort space, the heat pump system will produce over-cooling, and operate at less than its best efficiency. Also, in the hotter parts of the day, after the outdoor relative humidity has dropped, the heat pump system will cool to the reduced setpoint, and produce cooler conditions than the target optimal comfort.

Up until now, residential and commercial heating and air conditioning systems have been controlled, primarily or exclusively, on the basis of the sensible (dry bulb) temperature. Although some equipment has included a humidity sensor or humidistat, the control strategy itself has not produced an even comfort level or efficient operation. Typically, previously proposed control schemes produce simply a reduced setpoint under high humidity conditions, rather than an effective control of both sensible temperature and relative humidity.

Modern heat pump systems and air conditioning systems can employ to their advantage variable speed drives both for their compressors and also for fans and blowers in the indoor and outdoor heat exchangers. Variable speed operation permits the system cooling capacity to be varied over a range, and this permits the system to operate at optimal efficiency. Typically, the compressor speed is adjusted according to cooling demand, so that the system operates at full capacity only when there is a large cooling load, and can be reduced to a lesser capacity, e.g. down to fifty percent of full capacity, when there is a lower cooling load.

A method of controlling a variable speed heat pump and air conditioning system to maintain a user-selected comfort level is described in U.S. Pat. No. 4,873,649. In that scheme, a comfort index is calculated based on a number of parameters including the dry-bulb temperatures, humidity, air velocity, and other factors such as carbon dioxide level and particulate count. The comfort setting is used to adjust the compressor speed, blower speed, and evaporator superheat according to a rather complex relationship involving dynamic non-linear optimization. With such a scheme, it is not possible for a user simply to select a relative humidity setpoint, such as fifty percent, and also simply to select a temperature setpoint, as a rather complex comfort index setpoint is required as the operative parameter.

OBJECTS AND SUMMARY OF THE INVENTION

It is an object of this invention to improve integrated heat pump systems with a feature not provided in the prior art.

It is an object of this present invention to control a heat pump system during an air conditioning operation both as to sensible cooling and latent cooling.

It is still a further object of the present invention to control an air conditioning system to compensate for high humidity especially when the sensible cooling load is less than full cooling demand.

It is another object to provide a control system that is simple to implement and which does not require additional air conditioning equipment.

In accordance with an aspect of this invention, these and other objects are attained in an integrated heat pump system that may also include a water heating function, and that is capable of providing heating or cooling to an environmental comfort zone. The heat pump and hot water system includes a variable speed compressor whose operating speed, in an air conditioning mode, is more or less linearly related to the cooling load. That is the compressor speed depends on the difference between the air temperature in the indoor comfort space and the user-defined setpoint on the thermostat. To achieve this, the thermostat delivers a call for cooling which can be, e.g., is a percentage of full cooling capacity, depending on the above temperature difference, and this controls the compressor speed between a minimum compressor speed, e.g. 33 percent of full speed, and a maximum or full speed. The compressor cycles the refrigerant to an outdoor heat exchanger to condense the compressed refrigerant, which proceeds through an expansion valve to an indoor heat exchanger where the refrigerant evaporates in an evaporator coil to cool the air in the indoor comfort space. Then the refrigerant vapor returns to the compressor. The indoor heat exchanger has a variable speed fan or blower that moves the comfort space air over the evaporator coil at a controlled rate, and this rate depends also on the cooling load. In other words, the fan speed is controlled between a minimum fan speed, e.g. fifty percent of full speed, at low cooling demand. In order to carry this out a controller has an input connected to the thermostat and outputs coupled to the compressor and to the indoor fan. Under normal cooling operations, the controller varies the compressor speed from one hundred percent at full load down to a minimum of, for example, thirty-three percent (fifty percent of cooling capacity) at minimum cooling demand. The controller also controls the indoor airflow from one hundred percent (full speed) at full compressor speed down to fifty percent at thirty-three percent of full compressor speed.

A humidistat provides an indication to the controller when the comfort space relative humidity rises above a setpoint, for example, fifty percent relative humidity. When this happens, the controller assumes a humidity control mode, and alters the compressor speed, so that for a given cooling load, the compressor speed is somewhat higher, while the fan speed remains as in the normal cooling mode. That is, when the humidity is too high, the relation of compressor speed to indoor airflow changes to increase the dehumidification. The minimum compressor speed is increased to forty percent from the thirty-three percent speed minimum of the normal cooling mode, while the minimum fan speed remains at fifty percent. This results in a forty percent increase in latent cooling capacity at a minimum compressor speed, with the same sensible cooling capacity. Thus in this invention if the relative humidity is below some preset level the compressor speed varies generally linearly from the normal cooling minimum speed (thirty-three percent) to full speed, and if the relative humidity is above the preset level, the compressor speed varies from a higher humidity control minimum (forty percent) to full speed. The relation of fan speed to cooling load is the same in either mode. In both modes, the system operates at full compressor speed and full fan speed when there is a large sensible cooling demand.

With the system of the present invention, there will be maximum dehumidification at low sensible cooling loads when outdoor relative humidity is usually the highest, i.e., late evening, early morning, after a rain shower, etc. The system transitions automatically from maximum latent cooling to maximum sensible cooling as the cooling load increases to maximum. This maintains the indoor temperature at the comfort setpoint during the hottest parts of the day, i.e., midafternoon to late afternoon. The system optimally balances efficiency and comfort by maintaining automatically the indoor humidity and temperature at the user-established temperature and humidity setpoints.

In a typical practical system designed to provide 450 cfm of indoor airflow capacity, the indoor airflow per ton of cooling varies from 350 cfm/ton to 450 cfm/ton from minimum to maximum compressor speed.

The above and many other objects, features, and advantages of this invention will present themselves to those skilled in the art from the ensuing description of a preferred embodiment, to be read in conjunction with the accompanying Drawing.

BRIEF DESCRIPTION OF THE DRAWING

FIG. 2 is a chart showing the relation of compressor speed and airflow speed in a normal cooling mode and in a humidity control mode.

DETAILED DESCRIPTION OF THE PREFERRED EMBODIMENT

Figure 1:
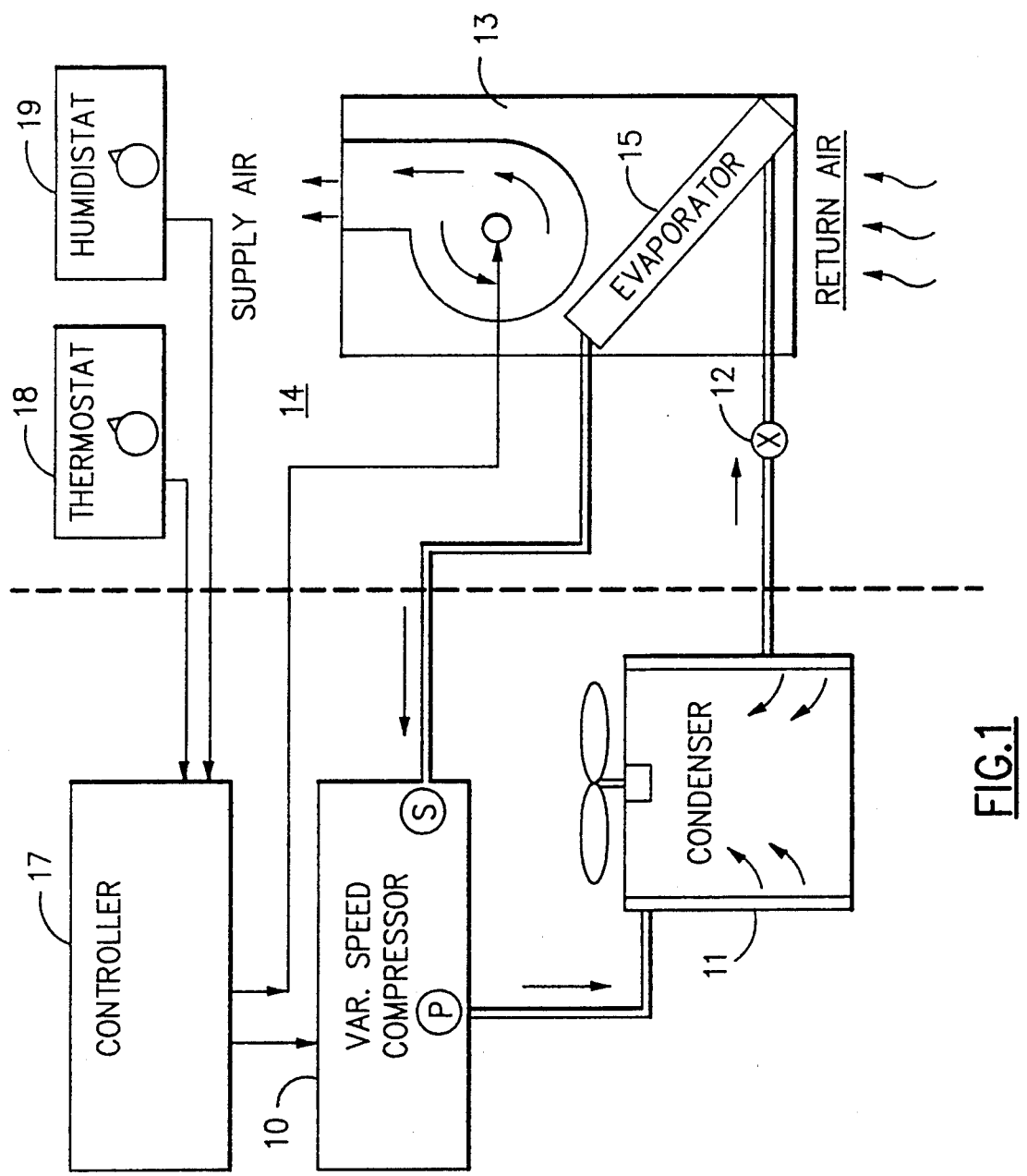
FIG. 1 is a diagrammatic representation of an integrated heat pump system, in an air conditioning mode, and which embodies the principles of the present invention.

With reference to the Drawing, and initially to FIG. 1, there is shown an integrated heat pump system, which is generally of known design. The system has a variable speed compressor 10 capable of pumping a refrigerant fluid received at low pressure at a suction or intake port S. The fluid is discharged at high pressure from a discharge port P. The compressed fluid passes through appropriate valving and conduit to an outdoor heat exchanger 11 which has a condenser coil in which the outdoor air accepts the heat from the compressed refrigerant. After leaving the outdoor heat exchanger 11, the condensed refrigerant passes to an expansion valve 12, and thence to an indoor heat exchanger 13 which cools and dehumidifies air in an indoor comfort space 14. The indoor heat exchanger 13 has an evaporator coil 15 which receives the condensed refrigerant at low pressure from the expansion valve 12, and returns the refrigerant as vapor to the suction port S of the compressor 10. A variable speed fan 16 in the indoor heat exchanger 13 draws return air from the comfort space 14 over the evaporator coil 15 and discharges supply air back into the comfort space. A microprocessor based system controller 17 has control outputs connected to the variable speed compressor 10 and the variable speed fan 16 for adjusting the compressor speed and the indoor air flow as a function of the cooling demand called for by a thermostat 18 that is connected to an input terminal of the controller. A humidistat 19, also located in the comfort space 14, is likewise coupled to an input of the controller 17 and provides a signal indicative of the relative humidity within the comfort space.

In this system, the thermostat 18 provides a cooling demand signal % which represents cooling demand as a percentage of the system maximum cooling capacity. This cooling demand % is calculated within the thermostat based on the difference between the air temperature within the comfort space 14 and a temperature setpoint that is user-established. The controller 17 varies the speed of the compressor 10 and the speed of the fan 16, each generally as linear functions of the value represented by the cooling demand signal %.

In the described embodiment, the humidistat 19 is of a make/break design, providing its humidity signal which is "on" if the relative humidity exceeds a user-established setpoint, and "off" as long as the relative humidity is below that setpoint. In some embodiments, the humidistat 19 can have a fixed nonadjustable setpoint, e.g., 50 percent. In other embodiments, the humidistat could be replaced by a humidity sensor that provides a proportional signal that depends on the actual relative humidity, or on the wet-bulb or latent temperature.

As shown in FIG. 2, when the relative humidity is low, and the humidistat 19 is in the off state, the controller 17 assumes a normal cooling mode for the heat pump system. The compressor speed is selected in accordance with the cooling demand signal % from a minimum compressor speed of thirty-three percent and corresponding minimum fan speed of fifty percent of full speed, when cooling demand is low, to a hundred percent of maximum compressor speed and a hundred percent of maximum fan speed at high cooling demand. Compressor speed and fan speed vary in a generally linear fashion for intermediate values of the cooling demand signal %.

When the humidistat 19 signals the controller 17 that the relative humidity level is too high, i.e. above the user selected setpoint, the controller 17 assumes a humidity control mode, and the relationship between compressor speed and indoor airflow is altered to increase the amount of dehumidification, as indicated on the lower graph in FIG. 2. In the humidity control mode, the minimum compressor speed is increased from about thirty-three percent to about forty percent, while the minimum air flow remains at fifty percent of maximum air flow. In the humidity control mode, the compressor speed is varied as a function of cooling demand substantially linearly between this higher minimum compressor speed and full compressor speed, while the fan speed is varied between the minimum fan speed and the maximum fan speed.

In this embodiment, when the system is in the humidity control mode, there is a forty percent increase in latent cooling at minimum compressor speed, with substantially the same sensible cooling capacity The indoor air flow per ton varies from 350 cfm/ton to 450 cfm/ton between minimum to maximum compressor speed.

As the outdoor temperature rises, and the sensible temperature cooling demand rises to full capacity, the normal cooling mode graph and the humidity control mode graph of FIG. 2 approach one another, so there is a smooth transition from maximum latent cooling to maximum sensible cooling as the sensible cooling load increases towards maximum.

With this system, humidity can be reduced when necessary during the cooler parts of the day, while automatically maintaining the indoor temperature at the comfort setpoint during the hotter parts of the day.

The control of relative humidity and sensible cooling, by changing the relation of the variable fan speed and the variable compressor speed, achieves optimal balance of efficiency and the variable compressor speed achieves the optimal balance of efficiency and comfort, without having to adjust humidity or temperature setpoints during the day.

While this invention has been described in detail with respect to a preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. A process for controlling an air conditioning system to control temperature and humidity wherein the air conditioner system comprises a variable speed compressor whose operating speed is varied as a function of cooling demand between a normal minimum compressor speed for low cooling demand and full compressor speed for high cooling demand; outdoor heat exchanger means coupled to a discharge outlet of the compressor for receiving compressed refrigerant therefrom and transferring heat to outdoor air; and indoor heat exchanger means for cooling and dehumidifying air in an indoor comfort space including an evaporator coil to receive condensed refrigerant from the outdoor heat exchanger means and having an outlet coupled to a return port of said compressor; and a variable speed fan for blowing the air of the comfort space at a controlled flow rate over said evaporator coil to reduce its temperature and to remove water vapor therefrom, the fan speed being varied with said cooling demand to vary with said compressor speed and with relative humidity in the comfort space from a minimum fan speed at a low cooling demand to a maximum speed at high cooling demand; the method comprising:

sensing the cooling demand in said comfort space,
sensing the relative humidity in said comfort space,
controlling the fan speed so that the air flow varies as a function of the cooling demand and relative humidity between said minimum fan speed and said maximum fan speed;
if the relative humidity is below a predetermined level, controlling the compressor speed as a function of said cooling demand between said normal minimum compressor speed and said full compressor speed; but
if the relative humidity is above said predetermined level, controlling the compressor speed as a function of said cooling demand that is substantially linear between a dehumidification minimum compressor speed, higher than said normal minimum speed, and said full compressor speed; and
controlling the fan speed to have a speed in the range between said minimum fan speed and said maximum fan speed, with a first linear relation relative to the compressor speed between said normal minimum compressor speed and said full compressor speed when the relative humidity is below said predetermined level, and with second linear relation relative to the compressor speed between said dehumidification minimum compressor speed and said full compressor speed when the relative humidity is above said predetermined level.

2. A process of controlling an air conditioning system according to claim 1 wherein said minimum fan speed is substantially fifty percent of said full fan speed.

3. A process of controlling an air conditioning system according to claim 1 wherein said normal minimum compressor speed is substantially thirty-three percent of said full compressor speed and said dehumidification minimum compressor speed is substantially forth percent of said full compressor speed.

4. A process of controlling an air conditioning system according to claim 1 wherein the cooling demand is provided based on a differential between air temperature within the comfort space and a user-selected setpoint temperature.

5. An air conditioning and humidity control system for controlling the temperature and relative humidity of air in an indoor comfort space comprising a variable speed compressor that has an operating speed that is varied as a function of cooling demand from a normal minimum speed at low cooling demand to a full compressor speed at high cooling demand, the compressor having a suction port and a discharge port; outdoor heat exchanger means coupled to the compressor discharge port to receive compressed refrigerant therefrom for transfer of heat to the outdoor air; an indoor heat exchanger for cooling and dehumidifying the air of the indoor comfort space including an evaporator coil coupled to receive condensed refrigerant from said outdoor heat exchanger means and to return refrigerant vapor to the compressor suction port; and a variable speed fan for blowing the comfort space air at a controlled flow rate over said evaporator coil to reduce the temperature of the comfort space air and to remove water vapor therefrom, the fan speed being varied as a function of the cooling demand and of relative humidity in the comfort space to vary generally linearly with the compressor speed between a minimum fan speed at low cooling demand and a maximum fan speed at high cooling demand; thermostat means disposed in said comfort space for providing a cooling load signal that varies according to the difference between the air temperature in said comfort space and a predetermined setpoint;

humidistat means situated in said comfort space providing a humidity signal indicative of the relative humidity of the comfort space air; and a controller having inputs coupled to the thermostat means and the humidistat means and outputs supplying speed control signals to said variable speed compressor and said variable speed fan, the controller being operative to control the fan speed in accordance with the value of the cooling load signal between said minimum fan speed and said maximum fan speed, and also being operative, if said humidity signal indicates that the comfort zone air relative humidity is below a predetermined level to control the compressor speed at a normal cooling load between said normal minimum compressor speed and said full compressor speed and if said humidity signal indicates that the comfort zone air relative humidity is above said predetermined level to control the compressor speed at a humidity control mode in which the compressor speed varies with cooling load between a dehumidification minimum compressor speed higher than said normal minimum compressor speed and said full compressor speed; and wherein said fan speed is controlled to have an airflow rate that varies substantially linearly with the compressor speed at said normal cooling mode between the minimum fan speed at said normal minimum compressor speed and the maximum fan speed at said full compressor speed and in the dehumidification mode between the minimum fan speed at said dehumidification minimum compressor speed and the maximum fan speed at said full compressor speed.

6. The air conditioning and humidity control system of claim 5 wherein said minimum fan speed in said normal cooling mode is the same speed as the minimum fan speed in said dehumidification mode.

7. The air conditioning and humidity control system of claim 6 wherein said minimum fan speed is substantially fifty percent of said maximum fan speed.

8. The air conditioning and humidity control system of claim 5 wherein in said normal cooling mode said minimum compressor speed is substantially thirty-three percent of said full compressor speed and in said dehumidification mode said minimum compressor speed is substantially forty percent of said full compressor speed.

9. The air conditioning and humidity control system of claim 5 wherein the relation of fan speed to compressor speed in said dehumidification mode has a linear slope that is higher than a corresponding linear slope of the relation of fan speed to compressor speed in the normal cooling mode.

* * * * *